United States Patent Office 3,276,178
Patented Oct. 4, 1966

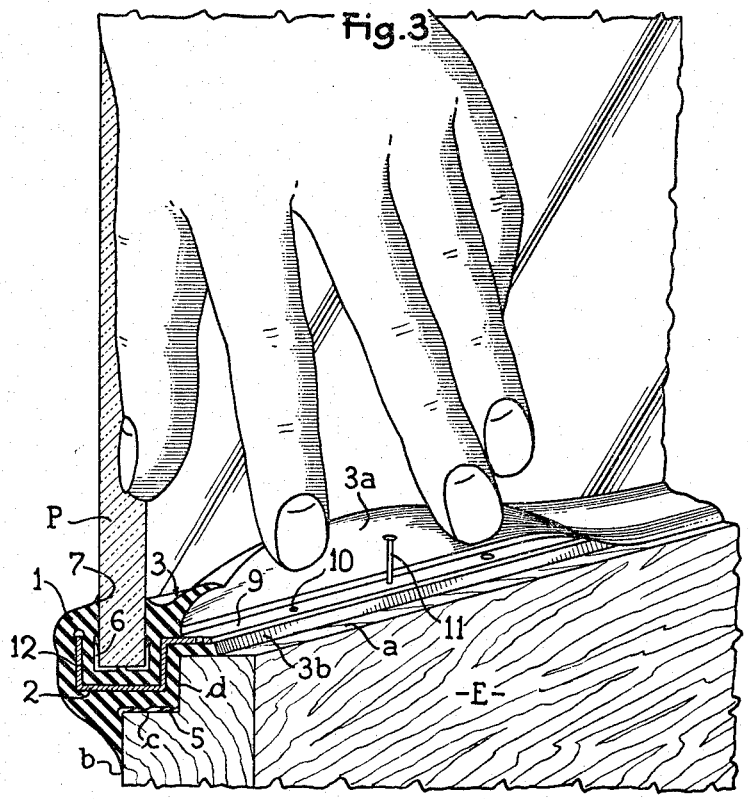
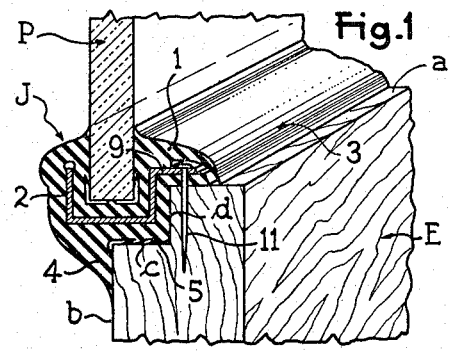
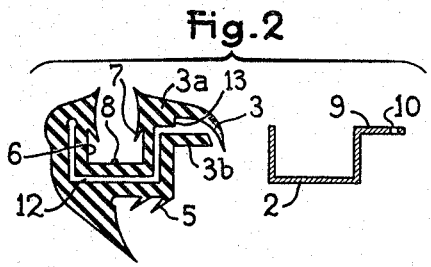

3,276,178
FITTINGS FOR MOUNTING A PANE OR A SHEET
IN A RABBET
Pierre Letourneur, Paris, and Charles Aubert, Saint-Cloud, France, assignors to Compagnie de Saint Gobain, Neuilly-sur-Seine, France, and Etablissements Hutchinson (Compagnie Nationale du Caoutchouc), Paris, France, both corporations of France
Filed Jan. 15, 1965, Ser. No. 425,857
5 Claims. (Cl. 52—400)

The present invention relates to the mounting of sheet material such as panes of glass, wood or other material in rabbets or like portions of structural members such as sashes, frames and similar members, and is particularly concerned with means for effecting such operation.

By way of example only of such a mounting, reference will be made hereafter to the mounting of a glass pane in a window sash, it being understood, however, that the invention is by no means limited thereto.

This latter mounting is traditionally carried out with the aid of tacks and putty. Besides not being adapted to modern building techniques, this method of mounting is subject to limitations. In particular, it does not permit the mounting in a rabbet of conventional width for a glass pane 3 mm. thick, of a glass pane having a thickness practically equal to the width of the rabbet, e.g. about 10 mm., which thickness is desirable to ensure thermal and acoustic insulation.

There is thus a demand for an elastic joint which enables these and similar mountings to be effected. The construction of such a joint is, however, difficult because it should comply with many requirements. In the first place, it must enable the panes to be fitted simply and ensure the tightness of the joint obtained.

On the other hand, though elastic, it must allow the pane fitted to be effectively secured in place and ensure that it is held in place even when overhanging if the rabbet is of reduced dimensions relative to the thickness of the pane.

Finally, for obvious reasons of security, it must continue to hold the pane in position in the event of fire partly destroying the joint.

It is an object of the invention to provide an elastic joint satisfying these various requirements.

According to the invention there is provided a joint for mounting sheet material in a rabbet or the like of a structural member. This joint comprises an elongate body of flexible and elastic material of U shape in cross section with the end of one arm of the U extended by a flange which is substantially parallel to the base of the U, and a metal frame of similar contour to said body engaged in a passage formed in the said body, said passage dividing the flange of the body into two lips which are separable from one another to give access to the flange of said frame and permit the flange and the lip therebeneath to be secured to a portion of the structural member alongside said rabbet, the cavity between the arms of the U serving to receive said sheet material.

Such a joint complies with the above requirements. In fact its fitting is simple since the flange of the metal frame, by means of which it is fixed, is readily accessible. Moreover, this frame ensures that the pane is held securely in the joint and, due to its rigidity, allows an overhang of the pane. Finally, if the body of the joint should be burnt, this frame fixed to the recess retains the pane in position.

Other features and advantages of the invention will become apparent from the following detailed description of a preferred embodiment by way of example with reference to the accompanying drawings in which:

FIG. 1 is a perspective view of a joint according to the invention in place in a rabbet.

FIG. 2 is a view in side elevation of this joint, the two components being separated, and FIG. 3 is a view similar to FIG. 1, showing the fitting of the joint.

In the drawing it has been assumed that the joint J according to the invention is intended for the mounting of a glass pane P in a rabbet of a structural element E, such as a window sash. The rabbet is produced by grooving a horizontal wall *a* and vertical wall *b* of the element E and is limited by a horizontal face *c* and a rectangular vertical face *d*.

It will be noted that the panel P has a thickness approximately equal to the width of the face *c*.

According to the embodiment shown, the joint J comprises a body 1 of a flexible and elastic material, for example rubber, and a metal frame 2.

The body 1 is an elongate member having in cross section the approximate shape of a U extended at the top of one of its arms by a laterally extending portion or flange 3 parallel to the base of the U and at the base of the other arm by a depending portion or sealing lip 4 substantially perpendicular to the base of the U. The flange 3 and the lip 4 are intended to be supported on the walls *a* and *b* respectively. The body 1 being fitted in the rabbet, its base being supported on the face *c* and its adjacent side face on one arm resting against the face *d*. The base of the body 1 is provided with thin sealing lips 5.

The central cavity 6 of the body 1 formed between the two arms thereof, serves to hold the pane P, its side faces each including a sealing fin 7 and its bottom having a central rib 8 for elastically supporting the pane.

The metal frame 2 is likewise composed of a structure having in cross section a U-shape extended at the top of one of its arms by a flange 9 parallel to its base. Holes 10 for the passage of fixing means 11, such as nails or screws are pierced at regular intervals in this flange.

A passage 12 of a shape corresponding to that of frame 2 is formed in the body 1. The passage 12 opens at the outside of the body 1, following the edge of the flange 3 which it thus divides into two lips 3*a*, 3*b*. When the frame 2 is not in place, it is possible—by separating the lips 3*a* and 3*b* widely to spread out the body 1 about the axis formed by the wall which bounds the opposite end of the passage 12. When the pane P is placed into the cavity 6 and the frame 2 is in place in the passage 12, it is possible—by lifting the upper lip 3*a*—to have accessibility to the flange 9 of the frame in order to insert the fixing means 11 in the holes 10 of this flange. In order to facilitate the lifting of the flange 3*a* and at the same time to arrange for locating the head of the fixing means 11, the flange 3*a* is reduced in thickness, which creates an undercut 13 in its lower face.

The joint according to the invention is used in the following manner:

The body 1 without the frame 2 a long length of which is supplied, is cut to requirements according to the length of the rabbet. The pane P is then inserted into the cavity 6 and then secured in this cavity by inserting the frame 2 which is itself cut to requirements, in the passage 12. The pane P and the joint J now as a unit are placed in position in the rabbet (FIG. 3) so that the lip 3*b* abuts against the wall *a* and the lip 4 against the wall *b*, the side face of the body 1 adjacent to the lip 3*b* and the base of the body 1 respectively coming into contact with the faces *d* and *a* of the rabbet. It is then simple to lift the lip 3*a* with one hand in order to expose the flange 9 of the frame 2, which allows the insertion with the other hand of fixing means 11 which are driven through holes 10 into the wall 3, to secure flange 9 and the lip 3b of the body 1 to the rabbet. This ensures the securing of the joint J and pane P to the element E.

From the foregoing the simplicity with which the joint J is employed will be appreciated. The frame 2 plays a multiple part in a particularly advantageous manner. It ensures in an effective manner the fixing of the joint J on the structural member E and in the event of destruction of the body 1 in the course of fire, it holds the pane P in place, which avoids accidents that would otherwise be caused by the pane falling out. Furthermore it ensures under normal conditions the locking of the pane P in the cavity 6 of the joint. Finally, the frame 2, due to its rigidity, allows the pane P to be fitted in an overhanging position and, consequently, permits the use of panes of great thickness with rabbets intended for thinner panes.

It will further be noted that a tight joint is completely ensured by the fins and lips 4, 5 and 7.

The invention is not limited to the embodiment shown and described which has been given by way of example only, thus, for example if absolute tightness of the joint is not necessary, the flange 4 can be dispensed with.

Having now described our invention, what we claim as new and desire to secure by Letters Patent is:

1. A joint for mounting sheet material in a groove in a structural member, said joint comprising an elongate body of flexible and elastic material having a U-shaped cross-section and a longitudinally extending lateral flange located at the top of the body corresponding to the top of one of the branches of the U and extending laterally in a direction substantially parallel to the base of the body corresponding to the base of the U, an elongate metal frame having a substantially similar cross-sectional shape to said body, said body having a longitudinal passage having a substantially similar shape and size to said frame, said frame being detachably located in said passage, the flange of said body being divided into two lips by the flange part of said passage and the flange of said frame extending between said lips, that one of said lips which is located above the flange of said frame covering but being resiliently and temporarily deformable away from said frame flange so as to permit temporarily laying bare the top face of said frame flange and fixing said frame flange and said body to said structural member by fixing means, said body having a cavity formed by the portions of said body corresponding to the branches of the U and adapted to receive a marginal portion of said sheet material, and apertures formed in the flange of said frame for receiving said fixing means.

2. A joint for mounting sheet material in a groove in a structural member, said joint comprising an elongate body of flexible and elastic material having a U-shaped cross-section and a longitudinally extending lateral flange located at the top of the body corresponding to the top of one of the branches of the U and extending laterally in a direction substantially parallel to the base of the body corresponding to the base of the U, an elongate metal frame having a substantially similar cross-sectional shape to said body, said body having a longitudinal passage having a substantially similar shape and size to said frame, said frame being detachably located in said passage, the flange of said body being divided into two lips by the flange part of said passage and the flange of said frame extending between said lips, that one of said lips which is located above the flange of said frame covering but being resiliently and temporarily deformable away from said frame flange so as to permit temporarily laying bare the top face of said frame flange and fixing said frame flange and said body to said structural member by fixing means, said body having a cavity formed by the portions of said body corresponding to the branches of the U and adapted to receive a marginal portion of said sheet material, and a longitudinally extending recess in that one of said lips located above the flange of said frame, the recess being adjacent the flange of said frame for accommodating the head portion of headed fixing means for fixing said frame and said body to the structural member.

3. A joint for mounting sheet material in a groove in a structural member, said joint comprising an elongate body of flexible and elastic material having a U-shaped cross-section, and a longitudinally extending lateral flange located at the top of the body corresponding to the top of one of the branches of the U and extending laterally in a direction substantially parallel to the base of the body corresponding to the base of the U, and an elongate metal frame having a substantially similar cross-sectional shape to said body, said body having a longitudinal passage having a substantially similar shape and size to said frame, said frame being detachably located in said passage, the flange of said body having an upper lip and a lower lip separated by the flange part of said passage and the flange of said frame extending between said lips, said upper lip freely covering but being resiliently and temporarily deformable away from a portion of said flange of said frame so as to temporarily lay bare the top face of said portion of said flange and thereby permit securing said portion of said flange to said structural member by securing means, said body having a cavity formed by the portions of said body corresponding to the branches of the U and adapted to receive a marginal portion of said sheet material, the flange of said frame including apertures for receiving headed fixing means for fixing said frame and said body to the structural member and said upper lip including a longitudinally extending recess adjacent the flange of said frame for accommodating the heads of said fixing means.

4. An assembly comprising a pane of glass, a window framework having a rabbet and a joint mounting the pane of glass in the rabbet of the window framework, said joint comprising an elongate body of flexible and elastic material having a U-shaped cross-section, and a longitudinally extending lateral flange located at the top of the body corresponding to the top of one of the branches of the U and extending laterally in a direction substantially parallel to the base of the body corresponding to the base of the U, and a metal frame having a substantially similar cross-sectional shape to said body, said body having a passage having a substantially similar shape and size to said frame, said frame being detachably located in said passage, the flange of said body being divided into two lips by the flange part of said passage and the flange of said frame extending between said lips, said body having a cavity formed by the portions of said body corresponding to the branches of the U, the pane of glass being located in and held in position by said cavity, and headed fixing members extending through the flange of said frame and through one of said lips and anchored into a portion of said window framework located alongside said rabbet, the portion of said body adjacent the flange of said body being engaged in said rabbet, and the other of said lips resiliently covering the heads of the fixing members.

5. An assembly comprising a pane, a framework having a rabbet and a joint mounting the pane in the rabbet, said joint comprising an elongate body of flexible and elastic material having a substantially U-sectioned portion comprising a base portion and two branches, a longitudinally extending lateral flange extending transversely from the free end of one of said branches in a direction substantially parallel to said base portion, a longitudinally extending sealing lip extending transversely from said U-sectioned portion in a direction substantially parallel to said branches and from a region of said base portion remote from said one of said branches, a longitudinally extending cavity defined by said branches and base portion, a passage in said body having substantially the same general cross-sectional shape as said U-sectioned portion combined with said flange, said flange of said body being divided by said passage so that the flange of said body has two lips, a frame having substantially the same cross-sectional shape and size as said passage and engaged in said passage, the frame having a flange portion extending between said lips in said passage, said pane being mounted in and held in position by said cavity and fixing means extending through said flange of said frame and through one of said lips and fixed into a portion of said framework located alongside one side of said rabbet, the other of said two lips being freely elastically deformable away from said frame for facilitating the fixing of said fixing means and subsequently covering the fixing means, said U-sectioned portion being partially engaged in said rabbet and said sealing lip being in close contact with a portion of said framework located alongside said rabbet on the opposite side of said rabbet to said fixing means and said two lips.

References Cited by the Examiner

UNITED STATES PATENTS

| | | | |
|---|---|---|---|
| 1,158,306 | 10/1915 | Schmid | 52—498 |
| 2,261,038 | 10/1941 | Sherts. | |
| 2,610,713 | 9/1952 | Bradley | 52—400 |
| 2,610,714 | 9/1952 | Bradley | 52—400 |
| 2,772,915 | 12/1956 | Renno. | |

FOREIGN PATENTS

| | | |
|---|---|---|
| 75,975 | 7/1961 | France. |
| 1,370,161 | 7/1964 | France. |

HARRISON R. MOSELEY, *Primary Examiner.*

W. E. HEATON, *Assistant Examiner.*